(12) United States Patent
Imran et al.

(10) Patent No.: US 12,248,058 B2
(45) Date of Patent: Mar. 11, 2025

(54) TRACK ASSOCIATION BASED ON AZIMUTH EXTENSION AND COMPACTNESS ERRORS

(71) Applicant: Aptiv Technologies AG, Schaffhausen (CH)

(72) Inventors: Syed Asif Imran, Moorpark, CA (US); Zixin Liu, Auburn Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 261 days.

(21) Appl. No.: 17/929,500

(22) Filed: Sep. 2, 2022

(65) Prior Publication Data

US 2024/0077602 A1    Mar. 7, 2024

(51) Int. Cl.
*G01S 13/72* (2006.01)
*G01S 13/86* (2006.01)

(52) U.S. Cl.
CPC .......... *G01S 13/723* (2013.01); *G01S 13/867* (2013.01)

(58) Field of Classification Search
None
See application file for complete search history.

(56) References Cited

U.S. PATENT DOCUMENTS

| | | | |
|---|---|---|---|
| 2017/0206436 A1* | 7/2017 | Schiffmann | G01S 13/931 |
| 2022/0262129 A1 | 8/2022 | Cao et al. | |
| 2023/0314599 A1* | 10/2023 | Jia | G01S 13/726 |
| | | | 701/28 |

OTHER PUBLICATIONS

Aziz, Kheireddine, et al., "Radar-camera Fusion for Road Target Classification", Dec. 4, 2020, IEEE (Year: 2020).*
Bai, Jie, et al., "Robust Detection and Tracking Method for Moving Object Based on Radar and Camera Data Fusion", Jan. 5, 2021, IEEE (Year: 2021).*
Rezatofighi, et al., "Generalized Intersection over Union: A Metric and A Loss for Bounding Box Regression", Jun. 2019, 9 pages.
Extended European Search Report regarding Patent Application No. 231759416, dated Dec. 7, 2023.

* cited by examiner

*Primary Examiner* — Todd Melton
*Assistant Examiner* — Sarah A. Mueller
(74) *Attorney, Agent, or Firm* — Harness, Dickey & Pierce, P.L.C.

(57) ABSTRACT

The techniques and systems herein enable track association based on azimuth extension and compactness errors. Specifically, first and second tracks comprising respective locations and footprints of respective objects are received. An azimuth distance is determined based on an azimuth extension error that corresponds to azimuth spread between the first and second tracks with respect to a host vehicle. A position distance is also determined based on a compactness error that corresponds to footprint difference between the first and second tracks. Based on the azimuth and position distances, it is established whether the first object and the second object are a common object. By doing so, the system can better determine if the tracks are of the common object when the tracks are extended (e.g., not point targets) and/or partially observed (e.g., the track is not of an entire object).

17 Claims, 6 Drawing Sheets

TRACK ASSOCIATION BASED ON AZIMUTH EXTENSION AND COMPACTNESS ERRORS

BACKGROUND

Vehicles can use various types of sensors to track stationary and moving objects proximate the vehicles (e.g., other vehicles, pedestrians, animals, buildings). The sensors (e.g., cameras, radar sensors, LiDAR sensors) collect data that can be used to infer position, shape, velocity, trajectory, class, and other parameters of the objects (e.g., tracks). Cluttered environments may cause a generation a plurality of tracks from the various sensors. As the tracks are generated, steps may be taken to pair and associate tracks originating from the different sensors to a common object (e.g., a camera track with a radar track). With many different possible associations or pairings of tracks, correctly matching or associating the different tracks to a common object (e.g., gating) can be difficult, especially for extended and/or partially observed tracks.

SUMMARY

This document is directed to systems, apparatuses, techniques, and methods for enabling track association based on azimuth extension and compactness errors. The systems and apparatuses may include components or means (e.g., processing systems) for performing the techniques and methods described herein.

Some aspects described below include a method that includes receiving, by at least one processor, a first track comprising a location and footprint of a first object and receiving, by the processor, a second track comprising a location and footprint of a second object. The method further includes determining, by the processor, an azimuth distance between the first track and the second track based on an azimuth extension error that corresponds to azimuth spread between the first track and the second track with respect to a host vehicle and determining, by the processor, a position distance between the first track and the second track based on a compactness error that corresponds to footprint difference between the first track and the second track. The method also includes establishing, by the processor and based on the azimuth distance that is based on the azimuth extension error and the position distance that is based on the compactness error, whether the first object and the second object are a common object.

The means may include a system comprising at least one processor configured to perform the above or other methods. The components may include computer-readable media (e.g., non-transitory storage media) including instructions that, when executed by the system, another system or component, or a combination thereof, implement the method above and other methods. This Summary introduces simplified concepts for enabling track association based on azimuth extension and compactness errors that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques for enabling track association based on azimuth extension and compactness errors are described with reference to the following drawings that use some of the same numbers throughout to reference like or examples of like features and components.

DETAILED DESCRIPTION

Overview

Cluttered environments may cause a generation a plurality of tracks from various sensors. Pairing and associating the tracks from the different sensors to common objects is important for correct environmental awareness. With many different possible associations or pairings of tracks, correctly matching or associating the different tracks to a common object can be difficult, especially for extended (e.g., non-point targets) and/or partially observed tracks (e.g., those where the track is not of an entirety of the associated object).

Traditional association techniques (gating techniques) generally compute differences between states and attributes (e.g., range, azimuth, position, velocity) of single points of respective tracks of pairs of tracks to determine whether the tracks are associated with common objects. For example, Mahalanobis distances of states (e.g., range, azimuth, position, velocity) between the track pairs are calculated with respect to a single reference point of the tracks. Improper selection of the reference points may cause significant errors in the association. Thus, while such techniques may work for point targets, they often fail when one or more of the tracks are extended and/or partially observed. Furthermore, techniques such as Intersection over Union (IoU) and Generalized Intersection over Union (GIoU)) may be unable to capture point information and extended information concurrently.

The techniques and systems herein enable track association based on azimuth extension and compactness errors. Specifically, first and second tracks comprising respective locations and footprints of respective objects are received. An azimuth distance is determined based on an azimuth extension error that corresponds to azimuth spread between the first and second tracks with respect to a host vehicle. A position distance is also determined based on a compactness error that corresponds to footprint difference between the first and second tracks. Based on the azimuth and position distances, it is established whether the first object and the second object are a common object. By doing so, the system can determine if the tracks are of the common object even when the tracks are extended and/or partially observed.

Example Environment

Figure 1:
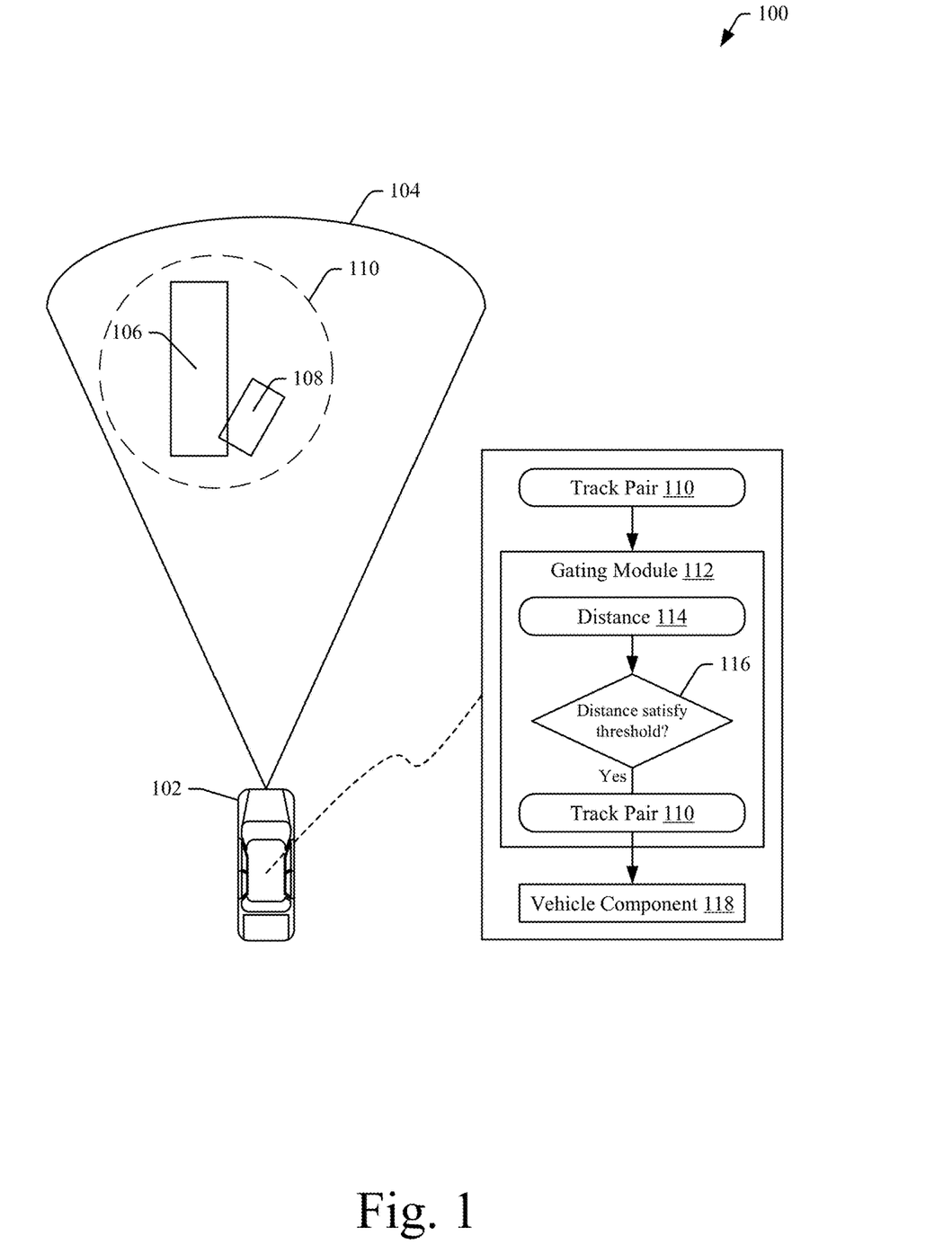
FIG. 1 illustrates, in accordance with techniques of this disclosure, an example environment where track association based on azimuth extension and compactness errors may be used.

FIG. 1 illustrates an example environment 100 where track association based on azimuth extension and compactness errors may be used. The example environment 100 contains a host vehicle 102 with a sensor perception range 104. Within the sensor perception range 104 is a track 106 and a track 108 that form a track pair 110. It should be noted that there may be any number of tracks and/or track pairs 110 within the sensor perception range 104 and that track 106 and track 108 are merely examples from respective sensors (e.g., track 106 is from a first type of sensor and track 108 is from a different type of sensor).

The host vehicle 102 may be any type of system (automobile, car, truck, motorcycle, e-bike, boat, air vehicle, and so on). The tracks 106, 108 may be of any type of moving or stationary objects (e.g., automobile, car, truck, motorcycle, e-bike, boat, pedestrian, cyclist, boulder, sign, wall, building) and may be generated from any types of sensor systems (e.g., camera, radar, lidar). For example, the track 106 may be a radar track from a radar system configured to produce or generate the track 106, and the track 108 may be a vision track from a vision system configured to produce or generate the track 108 (or visa-versa).

The host vehicle 102 has a gating module 112 that receives the track pair 110. The gating module then determines a distance 114 between the track pair 110 (e.g., azimuth extension error) and whether the distance 114 satisfies a threshold (e.g., at decision 116) that is indicative of the track pair 110 corresponding to the common object. The distance 114 may be a vector with azimuth and position components and is discussed in more detail below.

If the distance 114 satisfies the threshold (e.g., a "yes" from decision 116), then the track pair 110 may be considered as corresponding to the common object and may get passed (e.g., the tracks 106, 108, the track pair 110, an indication that they are of the common object) to a vehicle component 118. The vehicle component 118 can then track the object using both tracks 106, 108 of the track pair 110.

Example System

Figure 2:
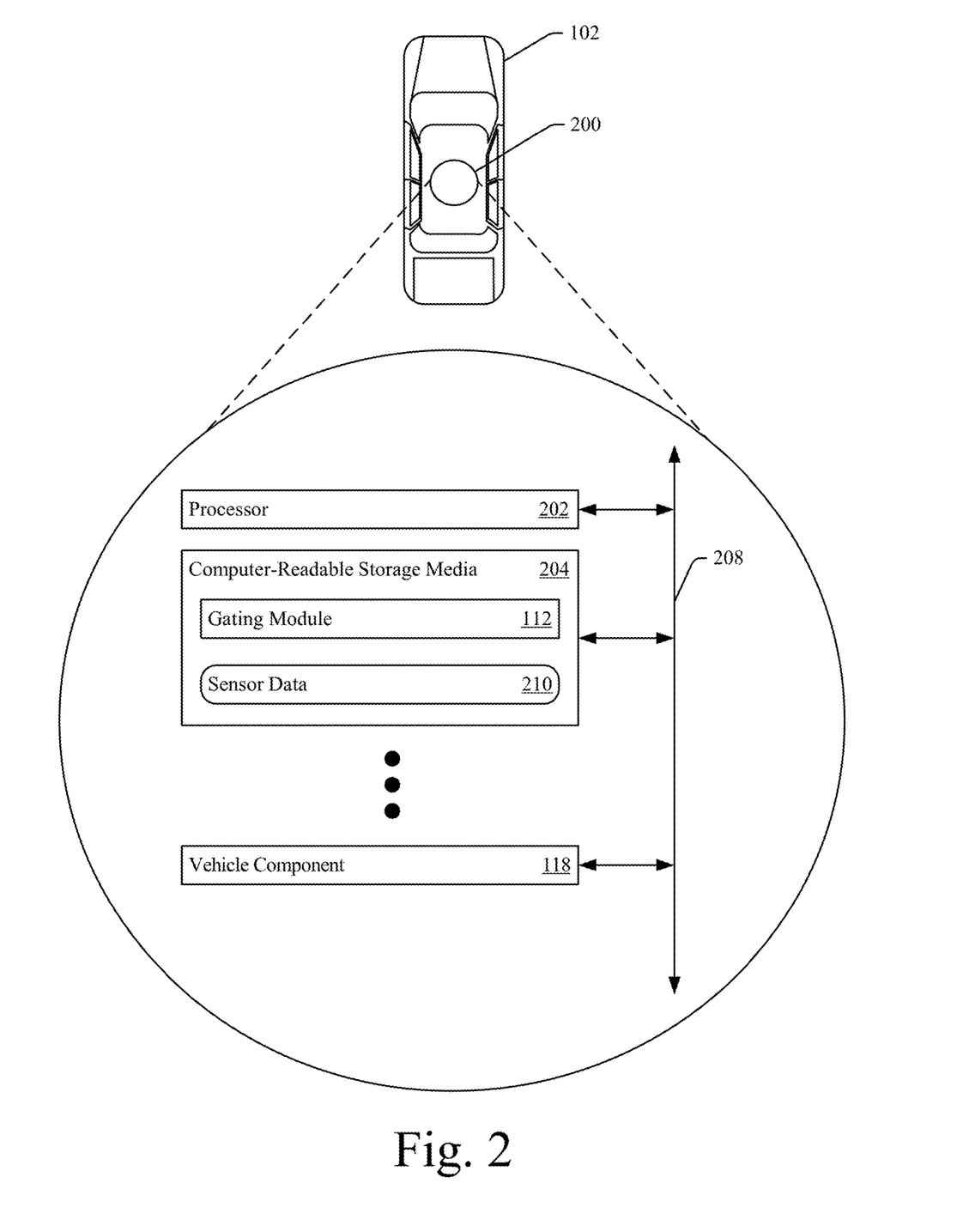
FIG. 2 illustrates, in accordance with techniques of this disclosure, an example system of a host vehicle configured to implement track association based on azimuth extension and compactness errors.

FIG. 2 illustrates an example system 200 configured to be disposed in the host vehicle 102 and configured to implement track association based on azimuth extension and compactness errors. Components of the example system 200 may be arranged anywhere within or on the host vehicle 102. The example system 200 may include at least one processor 202, computer-readable storage media 204 (e.g., media, medium, mediums), and the vehicle component 118. The components are operatively and/or communicatively coupled via a link 208.

The processor 202 (e.g., application processor, microprocessor, digital-signal processor (DSP), controller) is coupled to the computer-readable storage media 204 via the link 208 and executes instructions (e.g., code) stored within the computer-readable storage media 204 (e.g., non-transitory storage device such as a hard drive, solid-state drive (SSD), flash memory, read-only memory (ROM)) to implement or otherwise cause the gating module 112 (or a portion thereof) to perform the techniques described herein. Although shown as being within the computer-readable storage media 204, the gating module 112 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 202 and the computer-readable storage media 204 may be any number of components, comprise multiple components distributed throughout the host vehicle 102, located remote to the host vehicle 102, dedicated or shared with other components, modules, or systems of the host vehicle 102, and/or configured differently than illustrated without departing from the scope of this disclosure.

The computer-readable storage media 204 also contains sensor data 210 generated by one or more sensors or types of sensors (not shown) that may be local or remote to the example system 200. The sensor data 210 indicates or otherwise enables the determination of information usable to perform the techniques described herein. For example, one or more of the sensors (e.g., RADAR, LiDAR) may generate sensor data 210 usable to generate the tracks 106, 108. The sensor data 210 may be used to determine other attributes, as discussed below.

In some implementations, the sensor data 210 may come from a remote source (e.g., via link 208). The example system 200 may contain a communication system (not shown) that receives sensor data 210 from the remote source.

The vehicle component 118 contains one or more systems or components that are communicatively coupled to the gating module 112 and configured to use information about the tracks 106, 108 and/or the associated object to perform a vehicle function. For example, the vehicle component 118 may comprise a downstream processing module or an Advanced Driver Assist System (ADAS) with means for accelerating, steering, or braking the host vehicle 102. The vehicle component 118 is communicatively coupled to the gating module 112 via the link 208. Although shown as separate components, the gating module 112 may be part of the vehicle component 118 and visa-versa.

Example Ranges and Bounding Box

Figure 3:
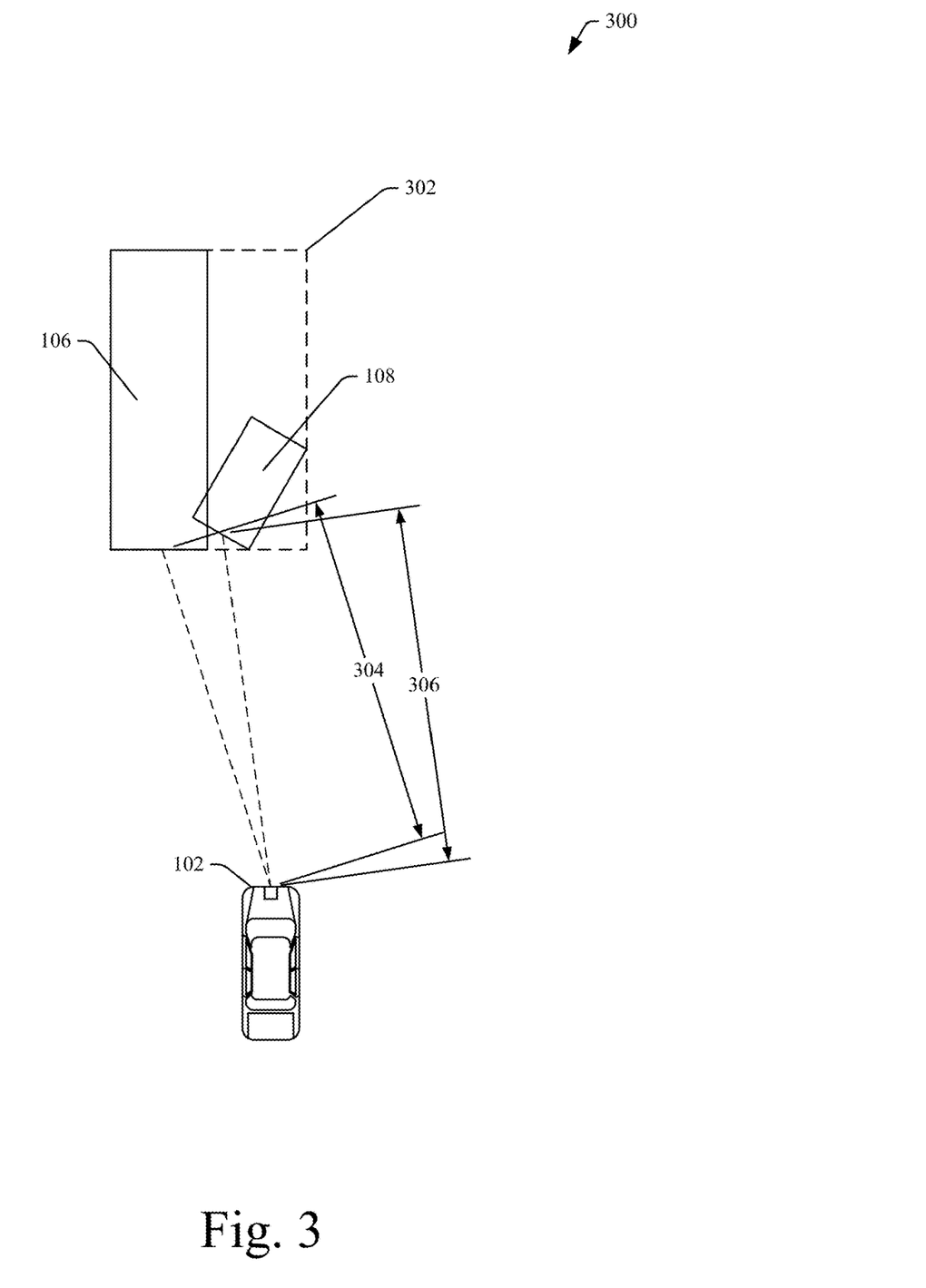
FIG. 3 illustrates, in accordance with techniques of this disclosure, example attributes of the environment of FIG. 1.

FIG. 3 illustrates, at 300, details of the example environment 100. The tracks 106, 108 are shown with a bounding box 302 surrounding them. The bounding box 302 may be a minimum rectangular area or box that encompasses or encloses the tracks 106, 108. The bounding box 302 is generally indicative of how far apart the two tracks are from each other.

Also shown are ranges 304, 306 to tracks 106, 108, respectively. Although shown as ranges to center points of leading edges of the tracks 106, 108, the ranges 304, 306 may be to any point on the tracks.

Example Azimuth Ranges

Figure 4:
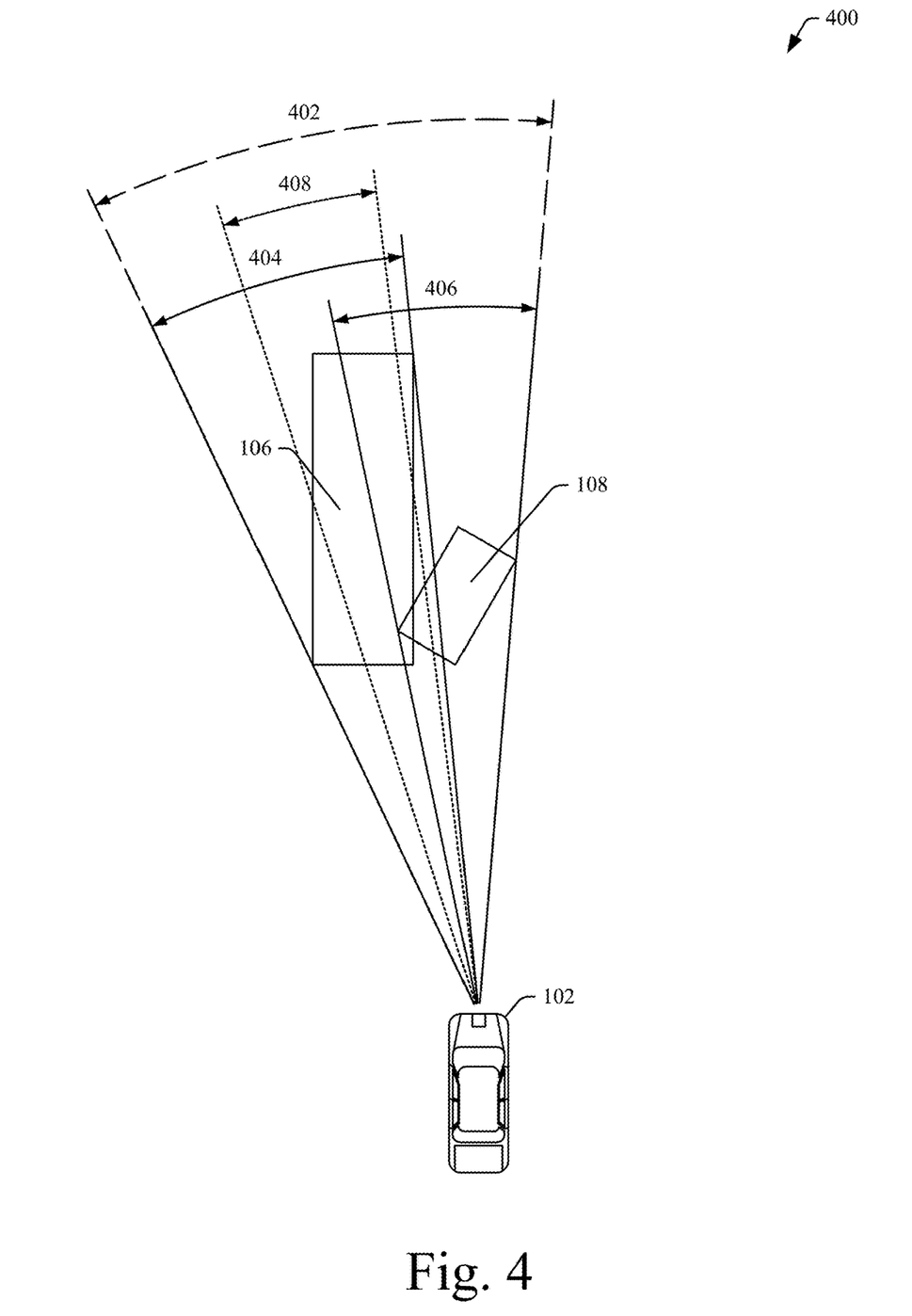
FIG. 4 illustrates, in accordance with techniques of this disclosure, other example attributes of the environment of FIG. 1.

FIG. 4 illustrates, at 400, details of the example environment 100. The tracks 106, 108 are again shown with corresponding azimuth ranges. A combined azimuth range 402 represents an azimuth range that encompasses or encloses both tracks 106, 108. A first track azimuth range 404 represents an azimuth range that encompasses or encloses track 106, and a second track azimuth range 406 represents an azimuth range that encompasses or encloses track 108. Point azimuth range 408 represents an azimuth range between the points used for the ranges 304, 306 (e.g., midpoints of the respective leading edges in the illustrated example.

Example Flow

Figure 5:
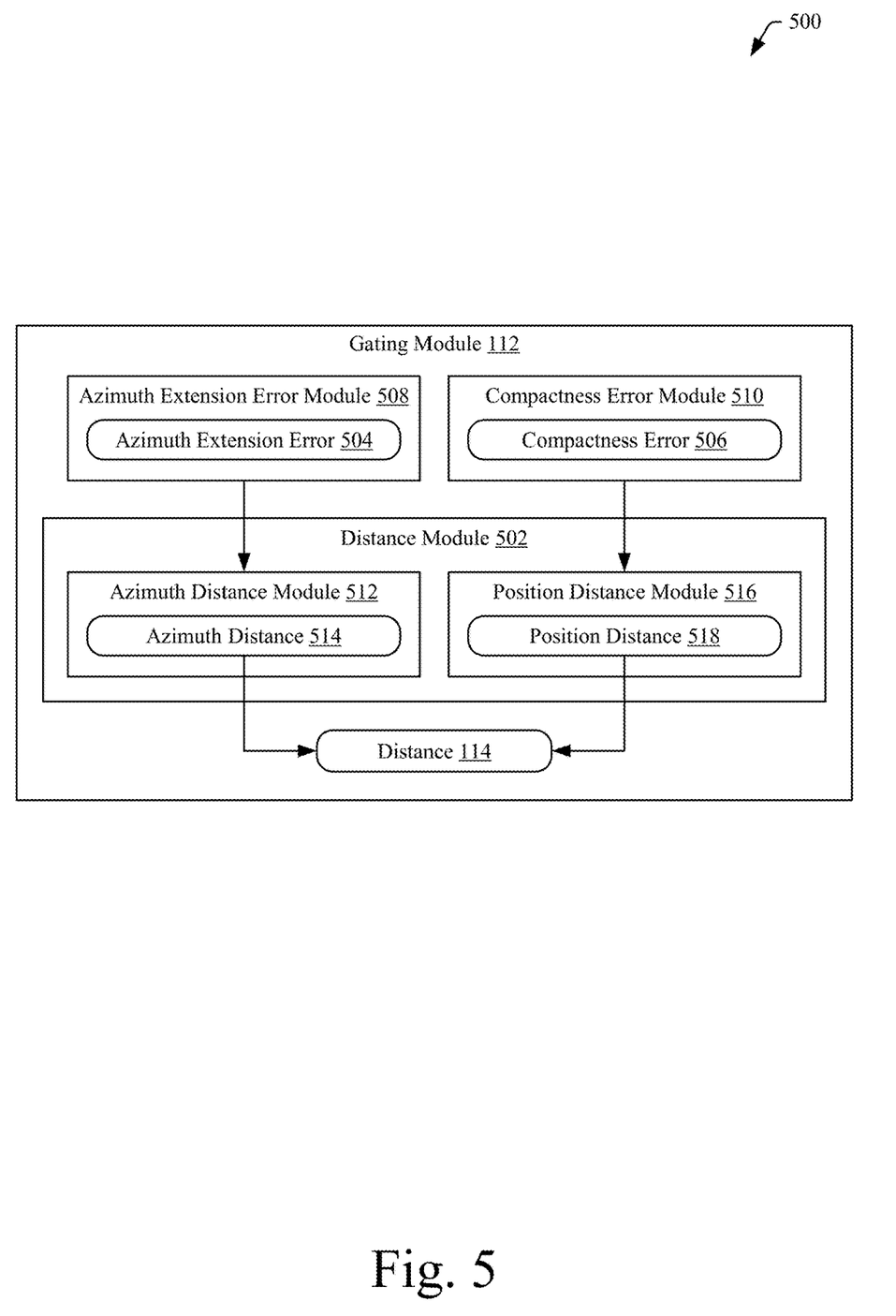
FIG. 5 illustrates, in accordance with techniques of this disclosure, an example flow of track association based on azimuth extension and compactness errors.

FIG. 5 illustrates, at 500, an example flow of track association based on azimuth extension and compactness errors. The gating module 112 contains a distance module 502 that calculates the distance 114 based on an azimuth extension error 504 and a compactness error 506.

An azimuth extension error module 508 calculates the azimuth extension error 504 based on Equation 1.

$$\theta_{Ext}(i,j) = \left( \frac{\Theta_{comb}(i,j)}{\Theta_i + \Theta_j} - 0.5 \right)^2 \quad (1)$$

In the above, i is associated with track 106, and j is associated with track 108. $\theta_{Ext}(i,j)$ is the distance 114 (e.g., azimuth extension error between track 106, 108). $\Theta_{comb}$ is the combined azimuth range 402. $\Theta_i$ is the first track azimuth range 404, and $\Theta_j$ is the second track azimuth range 406. $\theta_{Ext}(i,j)$ may be large when the tracks 106, 108 are far from each other in azimuth. Conversely, the $\theta_{Ext}(i,j)$ may be small when the tracks 106, 108 overlap. $\theta_{Ext}(i,j)$ may approach zero when the azimuth ranges 404 and 406 approach complete overlap.

A compactness error module 510 calculates the compactness error 506 based on Equation 2.

$$C_{Ext} = \left( \frac{\text{area of minimum enclosing rectangle}}{\text{Bbox area of } i + \text{Bbox area of } j} - 0.5 \right)^2 \quad (2)$$

$C_{Ext}$ is the compactness error. The area of minimum enclosing rectangle is the area of the bounding box 302 that encompasses tracks 106, 108. The Bbox area of i is the area of the track 106 (or a minimum enclosing rectangle of the track 106), and the Bbox area of j is the area of the track 108 (or a minimum enclosing rectangle of the track 108). $C_{Ext}$ may be large when the tracks 106, 108 are far from each other in position. Conversely, the $C_{Ext}$ may be small when the tracks 106, 108 overlap. $C_{Ext}$ may approach zero when the tracks 106, 108 are similarly sized and approach complete overlap.

Azimuth Distance

An azimuth distance module 512 calculates an azimuth distance 514 (e.g., a total weighted Mahalanobis distance for azimuth) based on Equation 3.

$$D_{Az}^{Weighted}(i,j) = w_{Ext}^{\theta}(i,j) Z(\theta_{Ext}(i,j)) + w_{Point}^{\theta}(i,j) Z(\theta_{Point}(i,j)) \quad (3)$$

$D_{Az}^{Weighted}(i,j)$ is the azimuth distance 514 between the tracks 106, 108. $w_{Ext}^{\theta}(i,j)$ is a relative weight of an azimuth extension distance. $Z(\theta_{Ext}(i,j))$ is a distance (e.g., Mahalanobis distance) for an azimuth extension and may be equal to $\theta_{Ext}/\sigma_{\theta Ext}^2$, where $\sigma_{\theta Ext}^2$ is a variance of the azimuth extension error 504. $w_{Point}^{\theta}(i,j)$ is a relative weight of a point azimuth angle distance. $Z(\theta_{Point}(i,j))$ is a point azimuth angle distance (e.g., Mahalanobis) for a point azimuth angle and may be equal to $(\theta_{Point}(i) - \theta_{Point}(j))^2/\sigma_{\theta Point}^2$, where $\sigma_{\theta Point}^2$ is a variance of an azimuth error.

$\sigma_{\theta Ext}^2$ and $\sigma_{\theta Point}^2$ vary depending on how far an object is from the host vehicle 102. $\sigma_{\theta Ext}^2$ and $\sigma_{\theta Point}^2$ can be obtained using a data driven approach from ground truth data of true positive matches/association and from azimuth uncertainty estimates of tracks.

$w_{Ext}^{\theta}$ and $w_{Point}^{\theta}$ are obtained from the lengths (e.g., of the longer sides) of the tracks 106, 108. For point targets (e.g., where the lengths are small and/or don't meet a threshold value), the reference-point based azimuth error may be dominant. Therefore, the value of $w_{Point}^{\theta}$ may be high and the value of $w_{Ext}^{\theta}$ may be low for point targets. Conversely, for extended targets (e.g., where the lengths are large and/or meet the threshold value), the azimuth extension error 504 may be dominant. Therefore, the value of $w_{Point}^{\theta}$ may be low and the value of $w_{Ext}^{\theta}$ may be high for extended targets.

Weight Factors for Azimuth Distance

The weight factors (e.g., $w_{Ext}^{\theta}$ and $w_{Point}^{\theta}$) may be calculated according to Equations 4 and 5 based on $L_i$ being a length of track 106 and $L_j$ being a length of track 108.

$$w_{Ext}^{\theta} = \begin{cases} 0 & \text{for } L_i, L_j \leq \alpha_L \\ 1 & \text{for } L_i, L_j > \alpha_H \\ f_{\theta}(L_i, L_j) \in (0,1] & \text{for } \alpha_L < L_i, L_j \leq \alpha_H \end{cases} \quad (4)$$

$$w_{Point}^{\theta} = 1 - w_{Ext}^{\theta} \quad (5)$$

$\alpha_L$ and $\alpha_H$ are minimum and maximum length thresholds, respectively, usable to determine whether the tracks 106, 108 may be considered as point targets or extended targets. If one or more of the tracks 106, 108 have lengths below or equal to $\alpha_L$, the tracks 106, 108 may be considered point targets. Similarly, if one or more of the tracks 106, 108 have lengths above or equal to $\alpha_H$, the tracks 106, 108 may be considered extended targets.

If the lengths of the tracks 106, 108 are in between $\alpha_L$ and $\alpha_H$, then the tracks 106, 108 may be considered as something in between point and extended targets. For such cases, $w_{Ext}^{\theta}$ may be determined using the function $f_{\theta}(L_i, L_j)$ based on Equations 6-10.

$$f_{\theta}(L_i, L_j) = \text{Mean}\left(L_{min}^{Scaled}, L_{max}^{Scaled}\right) \quad (6)$$

$$L_{min}^{Scaled} = k_l + (k_h - k_l) * K_{norm} * \left(\frac{L_{min}}{\alpha_{Pivot}}\right)^3 \quad (7)$$

$$L_{max}^{Scaled} = k_l + (k_h - k_l) * K_{norm} * \left(\frac{L_{max}}{\alpha_{Pivot}}\right)^3 \quad (8)$$

$$L_{min} = \text{Min}(L_i, L_j) \quad (9)$$

$$L_{max} = \text{Max}(L_i, L_j) \quad (10)$$

$k_h$, $k_l$ are scaling constants, and $K_{norm}$ is a normalization constant. $\alpha_{Pivot}$ is a pivot length. A track with a length above the pivot length is more likely to be extended target. Conversely, a track with a length below the pivot length is more likely to be a point target.

Using the above, the value of $w_{Ext}^{\theta}$ may approach 0 when $L_i, L_j$ approach $\alpha_L$. Conversely, the value of $w_{Ext}^{\theta}$ may approach 1 when $L_i, L_j$ approach $\alpha_H$.

Position Distance

A position distance module 516 calculates a position distance 518 (e.g., a total weighted Mahalanobis distance for position) based on Equation 11.

$$D_{Position}^{Weighted} = w_{Ext}^{C}(i,j) Z(\text{Compactness}_{Ext}(i,j)) + w_{Point}^{C}(i,j) Z(\text{Range}_{Point}(i,j)) \quad (11)$$

$D_{Position}^{Weighted}(i,j)$ is the position distance 518 between the tracks 106, 108. $w_{Ext}^{C}(i,j)$ is a relative weight of a compactness distance. $Z(\text{Compactness}_{Ext}(i,j))$ is a distance (e.g., Mahalanobis distance) for compactness and may be equal to $C_{Ext}/\sigma_{CExt}^2$, where $\sigma_{CExt}^2$ is a variance of the compactness error 506. $w_{Point}^{C}(i,j)$ is a relative weight of a point range distance. $Z(\text{Range}_{Point}(i,j))$ is a point range distance (e.g., Mahalanobis) and may be equal to $(C_{Point}(i) - C_{Point}(j))^2/\sigma_{CPoint}^2$, where $\sigma_{CPoint}^2$ is a variance of a range error.

$\sigma_{CExt}^2$ and $\sigma_{CPoint}^2$ vary depending on how far an object is from the host vehicle 102. $\sigma_{CExt}^2$ and $\sigma_{CPoint}^2$ can be obtained using a data driven approach from ground truth data of true positive matches/association and from position uncertainty estimates of tracks.

$w_{Ext}^C$ and $w_{Point}^C$ are obtained from the size (e.g., areas) of the tracks 106, 108. For point targets (e.g., where the areas are small and/or don't meet a threshold value), the reference-point based position error may be dominant. Therefore, the value of $w_{Point}^C$ may be high and the value of $w_{Ext}^C$ may be low for point targets. Conversely, for extended targets (e.g., where the areas are large and/or meet the threshold value), the compactness error 506 may be dominant. Therefore, the value of $w_{Point}^C$ may be low and the value of $w_{Ext}^C$ may be high for extended targets.

Weight Factors for Position Distance

The weight factors (e.g., $w_{Ext}^C$ and $w_{Point}^C$) may be calculated according to Equations 12 and 13 based on $A_i$ being an area of track 106 and $A_j$ being an area of track 108.

$$w_{Ext}^C = \begin{cases} 0 & \text{for } A_i, A_j \leq \beta_L \\ 1 & \text{for } A_i, A_j > \beta_H \\ f_C(A_i, A_j) \in (0, 1] & \text{for } \beta_L < A_i, A_j \leq \beta_H \end{cases} \quad (12)$$

$$w_{Point}^C = 1 - w_{Ext}^C \quad (13)$$

$\beta_L$ and $\beta_H$ are minimum and maximum area thresholds, respectively, usable to determine whether the tracks 106, 108 may be considered as point targets or extended targets. If one or more of the tracks 106, 108 have areas below or equal to $\beta$, the tracks 106, 108 may be considered point targets. Similarly, if one or more of the tracks 106, 108 have areas above or equal to $\beta_H$, the tracks 106, 108 may be considered extended targets.

If the areas of the tracks 106, 108 are in between $\beta_L$ and $\beta_H$, then the tracks 106, 108 may be considered as something in between point and extended targets. For such cases, $w_{Ext}^C$ may be determined using the function $f_C(A_i, A_j)$ based on Equations 14 and 15.

$$f_C(A_i, A_j) = K_{norm} * \left( \frac{A_{min} - \beta_L}{\beta_H - \beta_L} \right)^3 \quad (14)$$

$$A_{min} = \text{Min}(A_i, A_j) \quad (15)$$

$k_h$, $k_l$ are scaling constants, and $K_{norm}$ is a normalization constant. $\alpha_{Pivot}$ is a pivot length. A track with a length above the pivot length is more likely to be extended target. Conversely, a track with a length below the pivot length is more likely to be a point target.

Using the above, the value of $w_{Ext}^C$ may approach 0 when $A_i, A_j$ approach $\beta_L$. Conversely, the value of $w_{Ext}^C$ may approach 1 when $A_i, A_j$ approach $\beta_H$.

By using the techniques described herein, point information and extended information of tracks may be captured at the same time. Consequently, these techniques are effective in cases where one sensor reports a point target track (e.g., due to occlusion, resolution, sensor limitation) while another sensor reports an extended target track. Also, these techniques are effective in cases where two tracks have no overlap. Thus, these techniques are able to effectively gate tracks in a wider variety of environments and scenarios. Furthermore, computational costs may differ less dramatically with changes in track sizes compared to conventional techniques.

Example Method

Figure 6:
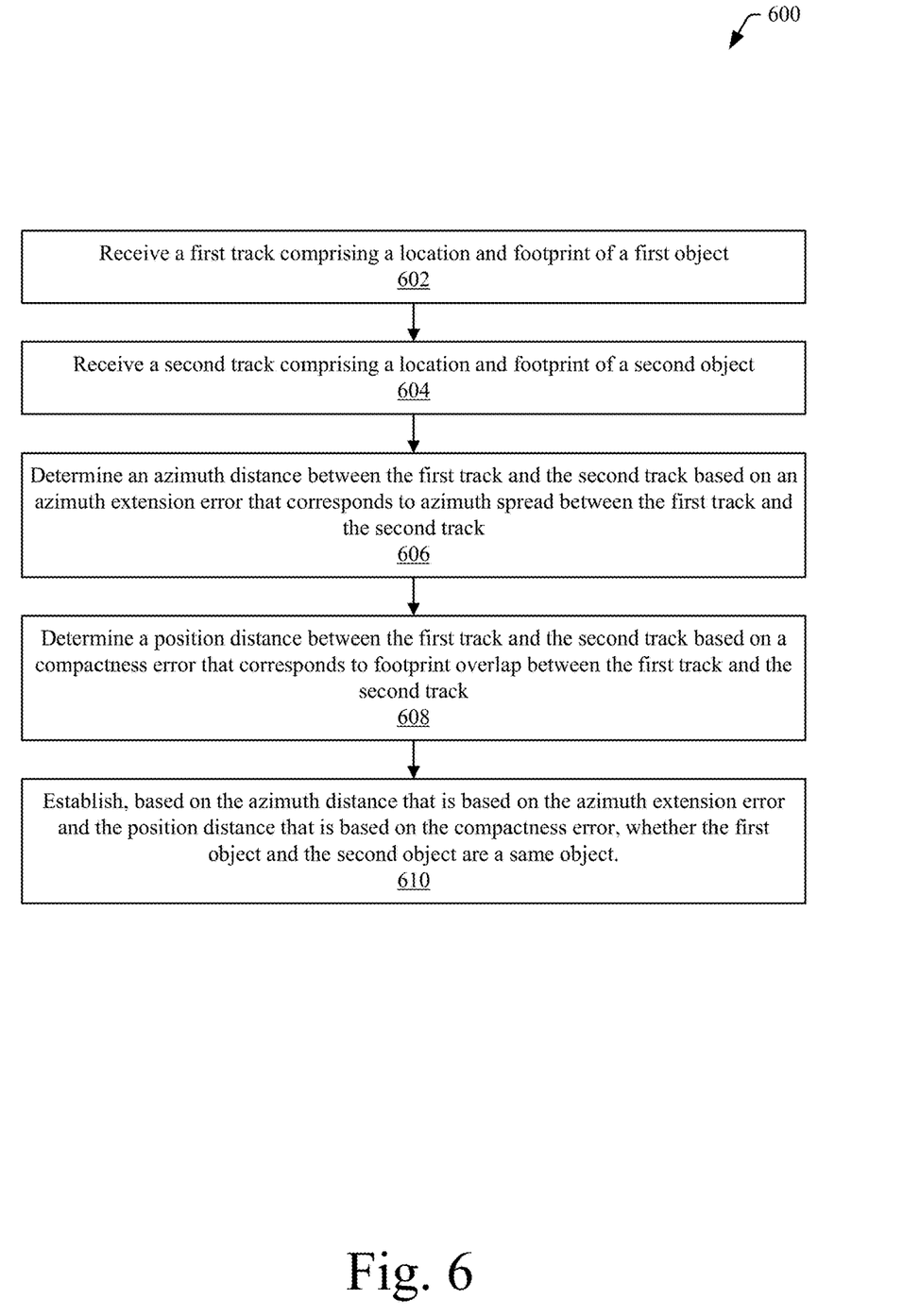
FIG. 6 illustrates, in accordance with techniques of this disclosure, an example method of track association based on azimuth extension and compactness errors.

FIG. 6 is an example method 600 for track association based on azimuth extension and compactness errors. The example method 600 may be implemented in any of the previously described environments, by any of the previously described systems or components, and by utilizing any of the previously described data flows, process flows, or techniques. For example, the example method 600 can be implemented in the example environment of FIG. 1, by the example system 200, by following the example data flow 500, and/or as illustrated in the example illustrations of FIGS. 3 and 4. The example method 600 may also be implemented in other environments, by other systems or components, and utilizing other data flows, process flows, or techniques. Example method 600 may be implemented by one or more entities (e.g., the gating module 112). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 602, a first track comprising a location and footprint of a first object is received. For example, the gating module 112 may receive the track 106.

At 604, a second track comprising a location and footprint of a second object is received. For example, the gating module 112 may receive the track 108.

At 606, an azimuth distance between the first track and the second track is determined based on an azimuth extension error that corresponds to azimuth spread between the first track and the second track with respect to a host vehicle. For example, the distance module 502 may determine the azimuth distance 514 between the tracks 106, 108 of the track pair 110.

At 608, a position distance between the first track and the second track is determined based on a compactness error that corresponds to footprint difference between the first track and the second track. For example, the distance module 502 may determine the position distance 518 between the tracks 106, 108 of the track pair 110.

At 610, it is established, based on the azimuth distance that is based on the azimuth extension error and the position distance error that is based on the compactness error, whether the first object and the second object are a common object. For example, the gating module 112 may compare the distance 114 (that is based on the azimuth distance 514 and the position distance 518) and determine whether the distance 114 satisfies a threshold value (e.g., at decision 116). If it does, the gating module 112 may pass the tracks 106, 108 and/or the track pair 110 to a downstream component (e.g., the vehicle component 118).

EXAMPLES

Example 1: A method comprising: receiving, by at least one processor, a first track comprising a location and footprint of a first object; receiving, by the processor, a second track comprising a location and footprint of a second object; determining, by the processor, an azimuth distance between the first track and the second track based on an azimuth extension error that corresponds to azimuth spread between the first track and the second track with respect to a host vehicle; determining, by the processor, a position distance between the first track and the second track based on a compactness error that corresponds to footprint difference between the first track and the second track; and establishing, by the processor and based on the azimuth distance that is based on the azimuth extension error and the position distance that is based on the compactness error, whether the first object and the second object are a common object.

Example 2: The method of example 1, further comprising determining the azimuth extension error based on a combined azimuth range encompassing the first track and the second track.

Example 3: The method of example 2, wherein determining the azimuth extension error is based further on a sum of an azimuth range of the first track and an azimuth range of the second track.

Example 4: The method of example 1, further comprising determining the compactness error based on a minimum rectangular area that encloses the first track and the second track.

Example 5: The method of example 4, wherein the determining the compactness error is based further on a sum of an area of the first track and an area of the second track.

Example 6: The method of example 1, wherein the azimuth distance and the position distance are Mahalanobis distances.

Example 7: The method of example 1, further comprising weighting, by the processor, components of the azimuth distance based on respective lengths of the first track and the second track.

Example 8: The method of example 1, further comprising weighting, by the processor, components of the position distance based on respective areas of the first track and the second track.

Example 9: The method of example 1, wherein the first track is a radar track.

Example 10: The method of example 1, wherein the second track is a vision track.

Example 11: A system comprising: at least one processor configured to: receive a first track comprising a location and footprint of a first object; receive a second track comprising a location and footprint of a second object; determine an azimuth distance between the first track and the second track based on an azimuth extension error that corresponds to azimuth spread between the first track and the second track with respect to a host vehicle; determine a position distance between the first track and the second track based on a compactness error that corresponds to footprint difference between the first track and the second track; and establish, based on the azimuth distance that is based on the azimuth extension error and the position distance that is based on the compactness error, whether the first object and the second object are a common object.

Example 12: The system of example 11, wherein the azimuth extension error is based on a combined azimuth range encompassing the first track and the second track and a sum of an azimuth range of the first track and an azimuth range of the second track.

Example 13: The system of example 11, wherein the compactness error is based on a minimum rectangular area that encloses the first track and the second track and a sum of an area of the first track and an area of the second track.

Example 14: The system of example 11, wherein the azimuth distance and the position distance are Mahalanobis distances.

Example 15: The system of example 11, wherein the azimuth distance has components that are weighted based on respective lengths of the first track and the second track.

Example 16: The system of example 11, wherein the position distance has components that are weighted based on respective areas of the first track and the second track.

Example 17: The system of example 11, wherein the first track is a radar track.

Example 18: The system of example 11, wherein the second track is a vision track.

Example 19: The system of example 11, further comprising a radar system configured to produce the first track and a vision system configured to produce the second track.

Example 20: A computer-readable storage media comprising instructions that, when executed, cause at least one processor to: receive a first track comprising a location and footprint of a first object; receive a second track comprising a location and footprint of a second object; determine an azimuth distance between the first track and the second track based on an azimuth extension error that corresponds to azimuth spread between the first track and the second track with respect to a host vehicle; determine a position distance between the first track and the second track based on a compactness error that corresponds to footprint difference between the first track and the second track; and establish, based on the azimuth distance and the position distance, whether the first object and the second object are a common object.

Example 21: A system comprising: at least one processor configured to perform the method of any of examples 1-10.

Example 22: Computer-readable storage media comprising instructions that, when executed, cause at least one processor to perform the method of any of examples 1-10.

Example 23: A system comprising means for performing the method of any of examples 1-10.

Example 24: A method performed by the system of any of examples 11-19.

Example 25: A method comprised by the instructions of example 20.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:
1. A method comprising:
  receiving, by at least one processor, a first track comprising a location and footprint of a first object;
  receiving, by the at least one processor, a second track comprising a location and footprint of a second object;

determining, by the a least one processor, an azimuth distance between the first track and the second track based on an azimuth extension error that corresponds to azimuth spread between the first track and the second track with respect to a host vehicle, wherein the azimuth spread is based on a sum of an azimuth range of the first track and an azimuth range of the second track;

determining, by the at least one processor, a position distance between the first track and the second track based on a compactness error that corresponds to footprint difference between the first track and the second track; and establishing, by the at least one processor and based on the azimuth distance that is based on the azimuth extension error and the position distance that is based on the compactness error, the first object and the second object as common objects; and performing, with an Advanced Driver Assist System (ADAS), a vehicle function, including at least one of accelerating, steering, or braking the host vehicle, in response to the first object and the second object being common objects.

2. The method of claim 1, further comprising determining the compactness error based on a minimum rectangular area that encloses the first track and the second track.

3. The method of claim 2, wherein the determining the compactness error is based further on a sum of an area of the first track and an area of the second track.

4. The method of claim 1, wherein the azimuth distance and the position distance are Mahalanobis distances.

5. The method of claim 1, further comprising weighting, by the at least one processor, components of the azimuth distance based on respective lengths of the first track and the second track.

6. The method of claim 1, further comprising weighting, by the at least one processor, components of the position distance based on respective areas of the first track and the second track.

7. The method of claim 1, wherein the first track is a radar track.

8. The method of claim 1, wherein the second track is a vision track.

9. A system comprising:
at least one processor configured to:
receive a first track comprising a location and footprint of a first object;
receive a second track comprising a location and footprint of a second object;
determine an azimuth distance between the first track and the second track based on an azimuth extension error that corresponds to azimuth spread between the first track and the second track with respect to a host vehicle;
determine a position distance between the first track and the second track based on a compactness error that corresponds to footprint difference between the first track and the second track, wherein the compactness error is based on a minimum rectangular area that encloses the first track and the second track and a sum of an area of the first track and an area of the second track; and establish, based on the azimuth distance that is based on the azimuth extension error and the position distance that is based on the compactness error, the first object and the second object as common objects;

wherein the host vehicle includes an Advanced Driver Assist System (ADAS) configured to perform a vehicle function, including at least one of accelerating, steering, or braking the host vehicle, in response to the first object and the second object being common objects.

10. The system of claim 9, wherein the azimuth extension error is based on a combined azimuth range encompassing the first track and the second track and a sum of an azimuth range of the first track and an azimuth range of the second track.

11. The system of claim 9, wherein the azimuth distance and the position distance are Mahalanobis distances.

12. The system of claim 9, wherein the azimuth distance has components that are weighted based on respective lengths of the first track and the second track.

13. The system of claim 9, wherein the position distance has components that are weighted based on respective lengths of the first track and the second track.

14. The system of claim 9, wherein the first track is a radar track.

15. The system of claim 9, wherein the second track is a vision track.

16. The system of claim 9, further comprising a radar system configured to produce the first track and a vision system configured to produce the second track.

17. A non-transitory computer-readable storage media comprising instructions that, when executed, cause at least one processor to:
receive a first track comprising a location and footprint of a first object;
receive a second track comprising a location and footprint of a second object;
determine an azimuth distance between the first track and the second track based on an azimuth extension error that corresponds to an azimuth spread between the first track and the second track with respect to a host vehicle;
determine a position distance between the first track and the second track based on a compactness error that corresponds to footprint difference between the first track and the second track, wherein the compactness error is based on a minimum rectangular area that encloses the first track and the second track and a sum of an area of the first track and an area of the second track; and
establish, based on the azimuth distance and the position distance, the first object and the second object as common objects;
wherein the host vehicle includes an Advanced Driver Assist System (ADAS) configured to perform a vehicle function, including at least one of accelerating, steering, or braking the host vehicle, in response to the first object and the second object being common objects.

* * * * *

UNITED STATES PATENT AND TRADEMARK OFFICE
CERTIFICATE OF CORRECTION

PATENT NO. : 12,248,058 B2
APPLICATION NO. : 17/929500
DATED : March 11, 2025
INVENTOR(S) : Syed Asif Imran et al.

Page 1 of 1

It is certified that error appears in the above-identified patent and that said Letters Patent is hereby corrected as shown below:

In the Claims

Column 11, Line 1: In Claim 1, delete "a" and insert --at--
Column 11, Line 4: In Claim 1, before "azimuth", insert --an--
Column 11, Line 12: In Claim 1, after "track;", delete "and"
Column 11, Line 51: In Claim 9, before "azimuth", insert --an--
Column 12, Line 24: In Claim 13, delete "lengths" and insert --areas--

Signed and Sealed this
Twenty-ninth Day of April, 2025

Coke Morgan Stewart
*Acting Director of the United States Patent and Trademark Office*